United States Patent
Du et al.

(10) Patent No.: US 9,679,076 B2
(45) Date of Patent: Jun. 13, 2017

(54) METHOD AND DEVICE FOR CONTROLLING PAGE ROLLBACK

(71) Applicant: Xiaomi Inc., Beijing (CN)

(72) Inventors: Zhongyi Du, Beijing (CN); Yifei Yu, Beijing (CN); Guoshi Xu, Beijing (CN)

(73) Assignee: Xiaomi Inc., Beijing (CN)

( * ) Notice: Subject to any disclaimer, the term of this patent is extended or adjusted under 35 U.S.C. 154(b) by 258 days.

(21) Appl. No.: 14/526,865

(22) Filed: Oct. 29, 2014

(65) Prior Publication Data

US 2015/0269270 A1 Sep. 24, 2015

Related U.S. Application Data (63) Continuation of application No. PCT/CN2014/082920, filed on Jul. 24, 2014.

(30) Foreign Application Priority Data

Mar. 24, 2014 (CN) .......................... 2014 1 0109876

(51) Int. Cl.
*G06F 17/30* (2006.01)
*G06F 17/22* (2006.01)

(52) U.S. Cl.
CPC .... *G06F 17/30896* (2013.01); *G06F 17/2235* (2013.01); *G06F 17/2247* (2013.01)

(58) Field of Classification Search
None
See application file for complete search history.

(56) References Cited

U.S. PATENT DOCUMENTS

| | | | |
|---|---|---|---|
| 5,948,112 A | 9/1999 | Shimada et al. | |
| 6,633,316 B1 | 10/2003 | Maddalozzo, Jr. et al. | |
| 7,509,576 B2 | 3/2009 | Kanai | |
| 8,527,883 B2* | 9/2013 | Sullivan ............ | G06F 17/30884 715/205 |
| 9,449,094 B2* | 9/2016 | Varian ............... | G06F 17/30864 |
| 2002/0143864 A1* | 10/2002 | Page ................. | G06F 17/30873 709/203 |
| 2002/0178007 A1* | 11/2002 | Slotznick ............ | G09B 5/06 704/270.1 |
| 2003/0037339 A1* | 2/2003 | Lee ................... | G06F 17/30873 725/109 |
| 2003/0066031 A1* | 4/2003 | Laane ............... | G06F 17/30899 715/234 |

(Continued)

FOREIGN PATENT DOCUMENTS

| | | |
|---|---|---|
| CN | 1581156 A | 2/2005 |
| CN | 101005566 A | 7/2007 |

(Continued)

OTHER PUBLICATIONS

International Search Report of PCT/CN2014/082920, from the State Intellectual Property Office of China, mailed Jan. 15, 2015.

(Continued)

*Primary Examiner* — Keith Bloomquist
(74) *Attorney, Agent, or Firm* — Finnegan, Henderson, Farabow, Garrett & Dunner LLP (57) ABSTRACT

A method for controlling page rollback includes acquiring a rollback operation, judging whether a preset rollback page corresponding to the rollback operation exists, and displaying the preset rollback page if the preset rollback page exists.

13 Claims, 7 Drawing Sheets

(56) References Cited

U.S. PATENT DOCUMENTS

| | | | |
|---|---|---|---|
| 2003/0172353 A1* | 9/2003 | Cragun | G10L 13/08 |
| | | | 715/243 |
| 2004/0168046 A1 | 8/2004 | Teruyama | |
| 2005/0066267 A1 | 3/2005 | Kanai | |
| 2005/0132297 A1 | 6/2005 | Milic-Frayling et al. | |
| 2006/0248444 A1* | 11/2006 | Vellanki | G06F 17/30899 |
| | | | 715/205 |
| 2008/0222556 A1 | 9/2008 | McKnight | |
| 2010/0131870 A1* | 5/2010 | Park | G06F 3/0481 |
| | | | 715/760 |
| 2010/0146412 A1 | 6/2010 | Nagase | |
| 2010/0161587 A1 | 6/2010 | Sullivan | |
| 2011/0087974 A1 | 4/2011 | Kulas | |
| 2014/0229842 A1* | 8/2014 | Voreis | G06F 17/30899 |
| | | | 715/738 |

FOREIGN PATENT DOCUMENTS

| | | | |
|---|---|---|---|
| CN | 101266623 | A | 9/2008 |
| CN | 101692679 | A | 4/2010 |
| CN | 101795317 | A | 8/2010 |
| CN | 101866362 | A | 10/2010 |
| CN | 101957816 | A | 1/2011 |
| CN | 102760162 | A | 10/2012 |
| CN | 102841757 | A | 12/2012 |
| CN | 103106282 | A | 5/2013 |
| CN | 103544176 | A | 1/2014 |
| CN | 103544213 | A | 1/2014 |
| CN | 103577085 | A | 2/2014 |
| CN | 103713815 | A | 4/2014 |
| CN | 103914523 | A | 7/2014 |
| EA | 008675 | B1 | 6/2007 |
| JP | 09-091190 | A | 4/1997 |
| JP | 2013-196313 | A | 9/2013 |
| RU | 96678 | U1 | 8/2010 |

OTHER PUBLICATIONS

English translation of International Search Report in International Application No. PCT/CN2014/082920, issued by the State Intellectual Property Office of the P.R. China as ISA, mailed Jan. 15, 2015, (2 pages).

Notification of the Results of Examination of Patentability for Russian Application No. 2015131126/08(047974), from Russian Patent Office, dated Feb. 1, 2017.

\* cited by examiner

METHOD AND DEVICE FOR CONTROLLING PAGE ROLLBACK

CROSS-REFERENCE TO RELATED APPLICATIONS

This application is a Continuation of International Application No. PCT/CN2014/082920, with an international filing date of Jul. 24, 2014, which claims priority to Chinese Patent Application No. 201410109876.X, filed on Mar. 24, 2014, the entire contents of both of which are incorporated herein by reference.

TECHNICAL FIELD

The disclosure relates to communication technology and, more particularly, to a method and device for controlling page rollback.

BACKGROUND

Returning to last page is one of basic functions of a browser, which assists a user to return to the last viewed webpage. The interface of a browser usually has a return widget for returning to the last page (hereinafter, unless otherwise specified, a "page" refers to a webpage). When the user needs to return to the last viewed page, he may return to the last page by clicking on the return widget.

Sometimes the user may have browsed a plurality of pages and wish to return to a certain page other than the last viewed page. With the conventional technology, the user needs to click on the return widget multiple times to go back to that certain page. For example, sometimes an article is displayed in multiple pages or a series of pictures are displayed in multiple pages. Browsing through such an article or series of pictures using the conventional technology is complicated.

SUMMARY

In accordance with the disclosure, there is provided a method for controlling page rollback. The method includes acquiring a rollback operation, judging whether a preset rollback page corresponding to the rollback operation exists, and displaying the preset rollback page if the preset rollback page exists.

Also in accordance with the disclosure, there is provided a device for controlling page rollback. The device includes a processor and a non-transitory computer-readable storage medium storing a computer program that, when executed by the processor, causes the processor to acquire a rollback operation, judge whether a preset rollback page corresponding to the rollback operation exists, and display the preset rollback page if the preset rollback page exists.

Also in accordance with the disclosure, there is provided a non-transitory computer-readable storage medium having stored therein instructions that, when executed by one or more processors of a terminal, cause the terminal to acquire a rollback operation, judge whether a preset rollback page corresponding to the rollback operation exists, and display the preset rollback page if the preset rollback page exists.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION

Embodiments consistent with the disclosure include a method and device for controlling rollback of webpages.

Hereinafter, embodiments consistent with the disclosure will be described with reference to the drawings. Wherever possible, the same reference numbers will be used throughout the drawings to refer to the same or like parts.

Figure 1:
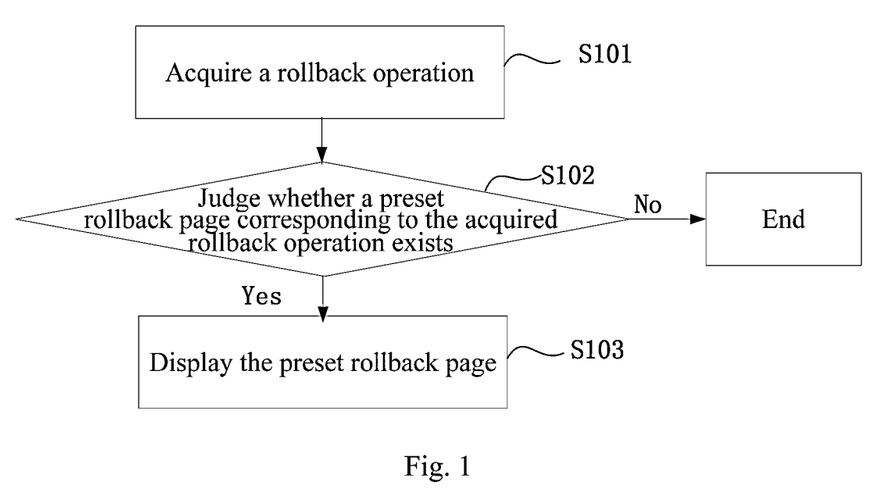
FIG. 1 is an illustrative flow chart showing a method for controlling page rollback according to an exemplary embodiment.

FIG. 1 is an illustrative flow chart showing an exemplary method for controlling page rollback consistent with embodiments of the disclosure. The method may be implemented in a terminal.

As shown FIG. 1, at S101, a rollback operation is acquired. Consistent with the disclosure, the rollback operation may be different from a return operation performed on common browsers by, for example, clicking the "back to the last page" widget. In some embodiments, a dedicated rollback widget for receiving the rollback operation is arranged on the browser. In some embodiments, one of the existing widgets on the browser may be programmed to also receive the rollback operation. For example, in a conventional browser, a "back to the last page" widget is usually provided, a single click on which triggers the function to return to the last page. In some embodiments of the disclosure, the "back to the last page" widget can be programmed to also trigger the rollback operation when a long pressing thereon is received.

At S102, whether a preset rollback page corresponding to the rollback operation exists is judged. Consistent with embodiments of the disclosure, the preset rollback page is preset to be either a last viewed page before the current page or a history page before the last viewed page. That is, the preset rollback page may not always be the last viewed page before the current page, but is set in advance as required.

If the preset rollback page exists, the preset rollback page is displayed. See S103 in FIG. 1. In some embodiments, to display the preset rollback page, a link address of the preset rollback page is acquired, and the preset rollback page is displayed by opening the page corresponding to the link address. In addition, a page content of the preset rollback page that is pre-stored may further be acquired, and the page content is loaded to the browser, so as to display the preset rollback page.

On the other hand, if no preset rollback page exists (in other words, the preset rollback page is null), no operation is performed. That is, the rollback operation has no effect, and the rollback flow is ended.

As discussed above, according to the method for controlling page rollback provided consistent with embodiments of the disclosure, a rollback operation is detected first, then whether a preset rollback page corresponding to the rollback operation exists is judged, and, if so, the preset rollback page is displayed.

For example, in the scenario in which a plurality of pages are used to display an article or a plurality of pictures of the same series, according to the method for controlling page rollback consistent with embodiments of the disclosure, a preset rollback page may be set to be a page containing a headline of the article or of the series of pictures. Thus, when a rollback operation entered by a user is acquired, the rollback page containing the headline locates can be opened directly. Such an operation is convenient, and avoids clicking the "back to the last page" widget multiple times to return to a previous history page.

Figure 2:
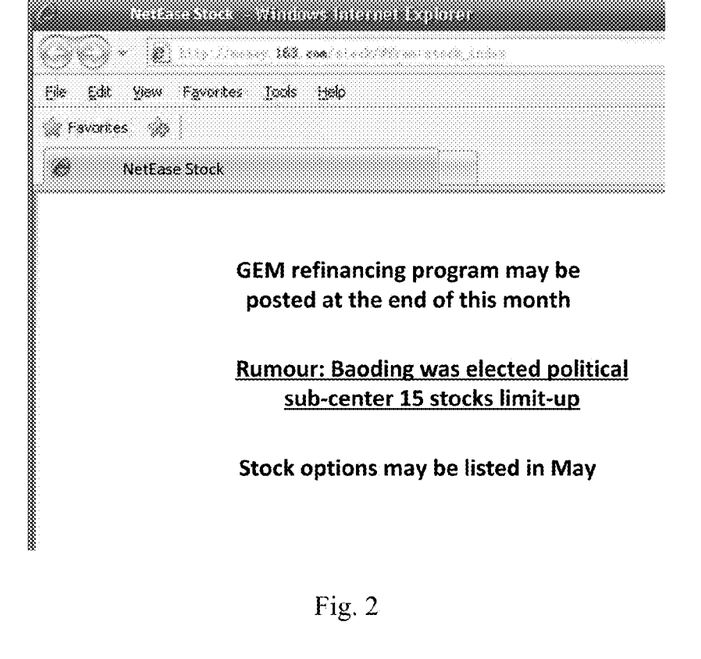
FIG. 2 is a diagram showing an example of a web page according to an exemplary embodiment.
Figure 3:
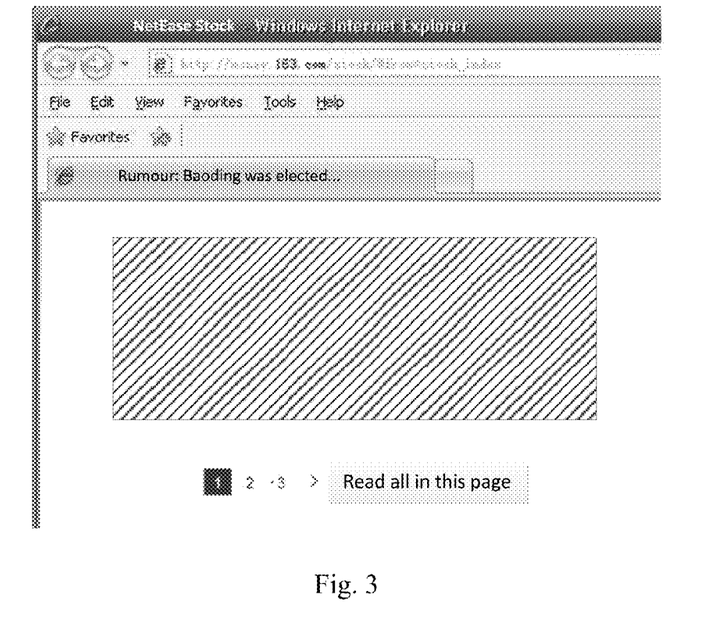
FIG. 3 is a diagram showing another example of a web page according to an exemplary embodiment.

FIG. 2 shows a home page of a finance sector of a news portal website. The home page contains a news headline, as indicated by a horizontal underline shown in FIG. 2. After the news headline is clicked on, a page shown in FIG. 3 is displayed. It can be seen from FIG. 3 that, the contents corresponding to the news headline are displayed in three pages. Assume the user has clicked in turn on the buttons "1," "2," and "3" shown in FIG. 3, which correspond to page 1, page 2, and page 3, respectively, of the contents, and is currently viewing the content of page 3. According to a conventional method, when the user needs to return to the page shown in FIG. 2, the user needs to click on the "back to the last page" widget to jump from page 3 to page 2, click on the "back to the last page" widget again to return from page 2 to page 1, and click on the "back to the last page" widget one more time to return from page 1 to the page shown in FIG. 2. Such operations are complicated, especially in situations where contents are displayed in tens or even hundreds of pages. Sometime it may be intolerable for some users to repeat such an operation.

On the other hand, according to the method consistent with embodiments of the disclosure, when the user enters the page shown in FIG. 3 by clicking the news headline, the page shown in FIG. 2 may be set as the preset rollback page. Thereafter, when the user browses any one of the pages shown in FIG. 3, the preset rollback page is kept unchanged. Thus, when the user is in any one of the pages shown in FIG. 3, and enters a rollback operation, the preset rollback page shown in FIG. 2 is displayed. This facilitates the usage of the user.

The method for controlling page rollback consistent with embodiments of the disclosure is described in regard to the use in a web page browsing scenario to rollback to viewed pages. However, the method consistent with embodiments of the disclosure can also be used in other scenarios or applications, such as, for example, e-book reading software or picture browsing software, to roll back to a certain page of a book or a certain picture.

Figure 4:
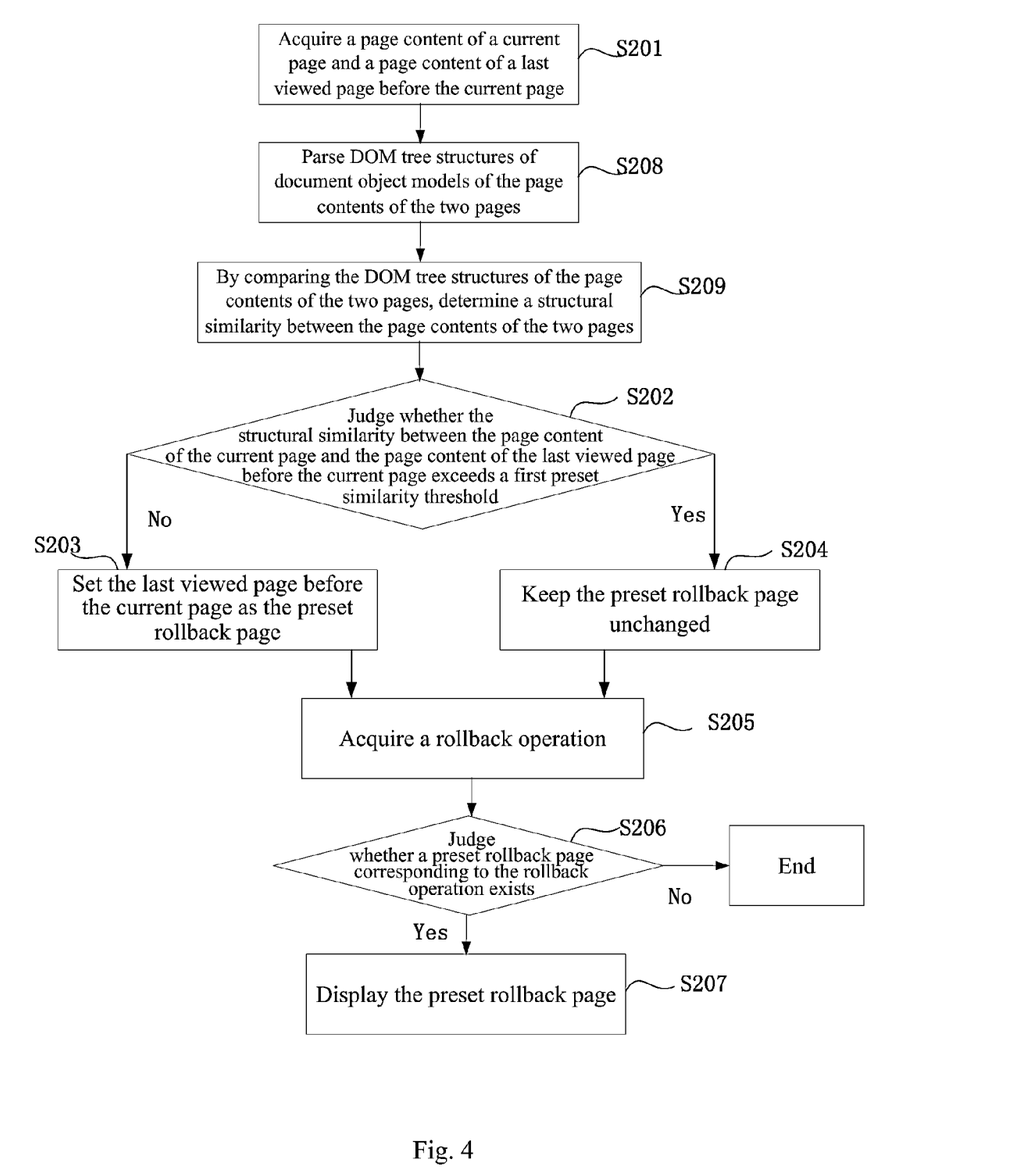
FIG. 4 is an illustrative flow chart showing a method for controlling page rollback according to an exemplary embodiment.

FIG. 4 is an illustrative flow chart showing an exemplary method for controlling page rollback consistent with embodiments of the disclosure. The method can be implemented in a terminal.

As shown in FIG. 4, at S201, a page content of a current page and a page content of a last viewed page before the current page are acquired.

At S202, whether a structural similarity between the page content of the current page and the page content of the last viewed page before the current page exceeds a first preset similarity threshold is judged. In some embodiments, to judge the structural similarity between page contents, the page contents' Document Object Model (DOM) tree structures are compared. For example, if the DOM tree structure of the page content of the current page is the same as that of the page content of the last viewed page before the current page, it may be determined that the structural similarity between the page content of the current page and the page content of the last viewed page before the current page exceeds the first preset similarity threshold. In addition, if the DOM tree structure of the page content of the current page and the DOM tree structure of the page content of the last viewed page before the current page are parent-child structures, it may also be determined that the structural similarity between the two page contents exceeds the first preset similarity threshold. In some embodiments, the similarity between the two page contents may also be determined by other parameters in the page contents, such as a quantified parameter. In such embodiments, the first preset similarity threshold may be set as a specific value of the quantified parameter.

If the structural similarity between the page content of the current page and the page content of the last viewed page before the current page does not exceed the first preset similarity threshold, the last viewed page before the current page is set as the preset rollback page. See S203 in FIG. 4. Generally, the plurality of pages of the same article or the pages of the picture set in the same series adopt the same page structure. Therefore, if the structural similarity between the page content of the current page and the page content of the last viewed page exceeds the first preset similarity threshold, it may be determined that the two page contents belong to the plurality of pages corresponding to the same headline. In contrast, if the structural similarity between the two page contents does not exceed the first preset similarity threshold, the current page and the last viewed page may not belong to the same headline. In this case, the last viewed page before the current page is set as the preset rollback page.

If the structural similarity between the page content of the current page and the page content of the last viewed page before the current page exceeds the first preset similarity threshold, the preset rollback page is kept unchanged. See S204 in FIG. 4. That is, if the page content of the current page and the page content of the last viewed page are determined as belonging to the plurality pages corresponding to the same headline, there is no need to re-set the preset rollback page, and the previous preset rollback page is maintained.

As described above, when the user is browsing the plurality of pages corresponding to the same headline, no matter what the current page is, the preset rollback page is fixed as the page containing the headline. As such, when a rollback is subsequently needed, it is able to directly rollback to the preset rollback page.

At S205, a rollback operation is acquired. In some embodiments, acquiring the rollback operation includes detecting whether the preset rollback widget is triggered and, if so, a time length of triggering the rollback widget is recorded. Acquiring the rollback operation further includes judging whether the time length exceeds a preset time length threshold and, if so, it is determined that the rollback operation has been acquired.

In some embodiments, triggering the preset rollback may include a long time clicking on the preset rollback widget by a mouse for a computer, or a long time pressing on the preset rollback widget by a user for a mobile phone or a tablet PC with a touch screen.

S206~S207 in FIG. 4 are the same as S102~S103 shown in FIG. 1, the detailed description of which is omitted here.

In the embodiments described above, only when the structural similarity between the page content of the current web page and the page content of the last viewed page before the current page does not exceed the preset threshold, that is, the two page contents do not belong to the pages of the same headline, there is a need to further determine whether the last viewed page before the current web page is to be set as the preset rollback page. On the other hand, when the structural similarity between the page content of the current web page and the page content of the last viewed page before the current page exceeds the preset threshold, the previous preset rollback page is kept unchanged.

According to the above-described method, when the web pages corresponding to different headlines are browsed, the preset rollback page may be updated in time, such that the user may rollback to a certain preset rollback page when browsing any of the web pages. In addition, when the user browses a plurality of pages corresponding to the same headline, it is also able to assure that the preset rollback page is kept unchanged.

In some embodiments, the method for controlling page rollback further includes parsing DOM tree structures of document object models of the page contents of the current page and the last viewed page before the current page (S208 in FIG. 4), and determining the structural similarity between the page contents of the two pages by comparing the DOM tree structures of the page contents of the two pages (S209 in FIG. 4).

In some embodiments, S208~S209 may be performed before step S202, but the specific order of S208 and S209 is not limited.

Figure 5:
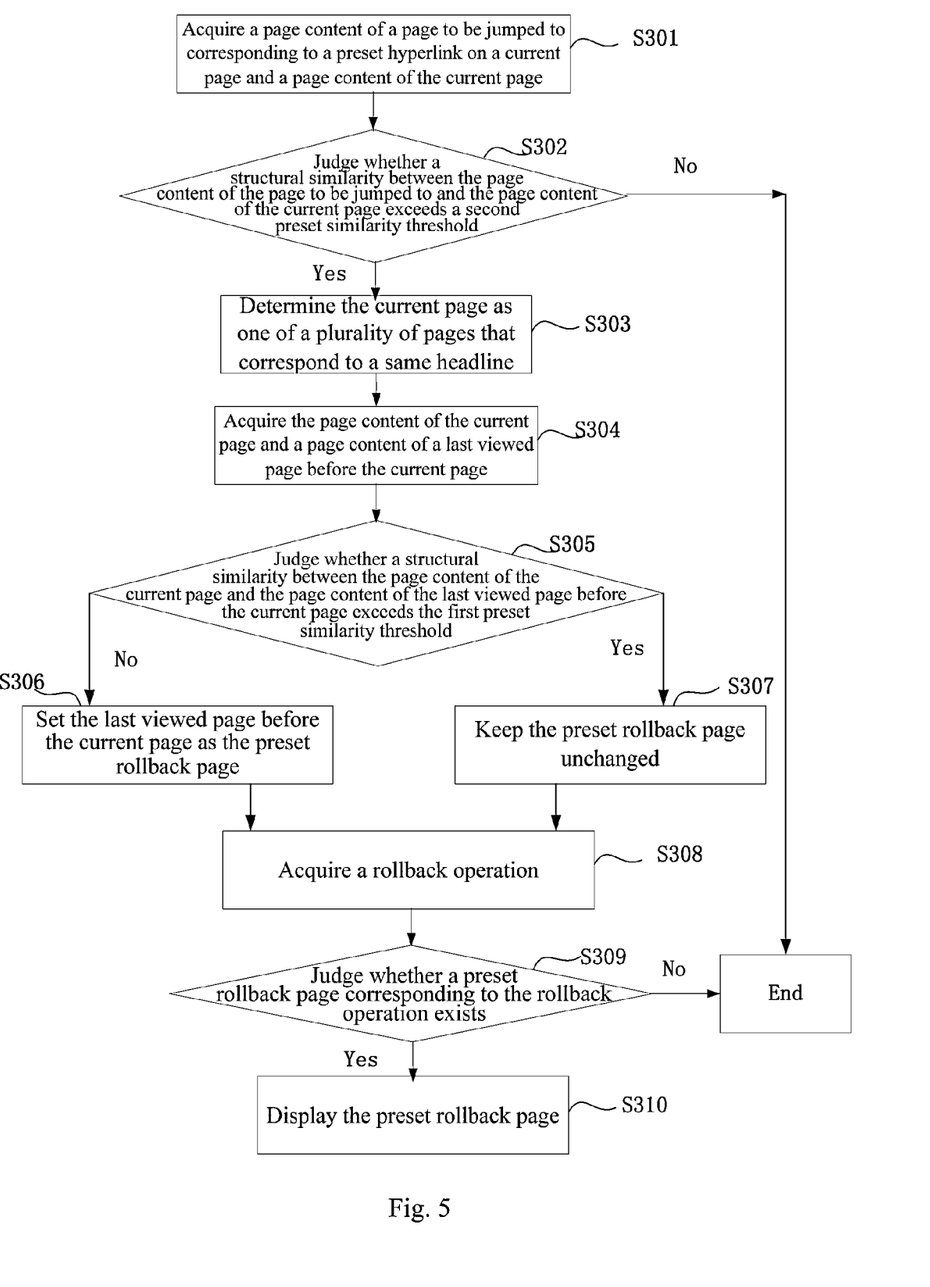
FIG. 5 is an illustrative flow chart showing a method for controlling page rollback according to an exemplary embodiment.

FIG. 5 is an illustrative flow chart showing an exemplary method for controlling page rollback consistent with embodiments of the disclosure. The method may be implemented in a terminal.

As shown in FIG. 5, at S301, a page content of a page to be jumped to and a page content of the current page are acquired. The page to be jumped to corresponds to a preset hyperlink on the current page. That is, the page content of the page to be jumped to is acquired when the current page is being displayed, which is referred to as a web page pre-reading function. In some embodiments, acquiring the page content of the page to be jumped to includes acquiring all the hyperlinks on the current page, judging whether a preset hyperlink exists among all the hyperlinks on the current page, and, if so, acquiring the page content of the page to be jumped to that corresponds to the preset hyperlink.

Feature characters for identifying the preset hyperlink include, but are not limited to: next page, next article, next chapter, next, →, or ↓. In some embodiments, depending on different designs of web page designers, the feature characters for identifying the preset hyperlink may be updated.

At S302, whether a structural similarity between the page content of the page to be jumped to and the page content of the current page exceeds a second preset similarity threshold is judged. The judgment of structural similarity in S302 is similar to the judgment of structural similarity S202 in FIG. 4, and thus a detailed description of S302 is omitted here.

If the structural similarity between the page content of the page to be jumped to and the page content of the current page exceeds the second preset similarity threshold, the current page is determined as one of a plurality of pages that correspond to a same headline (see S303 in FIG. 5). If the structural similarity does not exceed the second preset similarity, the flow is ended.

If the current page is one of the plurality of pages that correspond to the same headline, the page content of the current page and the page content of the last viewed page before the current page are acquired. See S304 in FIG. 5.

At S305, whether a structural similarity between the page content of the current page and the page content of the last viewed page before the current page exceeds a first preset similarity threshold is judged.

If the structural similarity between the page content of the current page and the page content of the last viewed page before the current page does not exceed the first preset similarity threshold, the last viewed page before the current page is set as the preset rollback page. See S306 in FIG. 5.

If the structural similarity between the page content of the current page and the page content of the last viewed page before the current page exceeds the first preset similarity threshold, the preset rollback page is kept unchanged. See S307 in FIG. 5.

S304~S307 are the same as S201~S204 shown in FIG. 4, and steps S308-S310 are the same as S101~S103 shown in FIG. 1. Therefore, the detailed description thereof is omitted here.

According to the embodiments described above, by dually judging the structural similarity between the page content of the page to be jumped to and the page content of the current page, and the structural similarity between the page content of the current page and the page content of the last viewed page before the current page, the update of the preset rollback page may be performed more accurately. Therefore, rollback operation failure caused by an incorrect update of the preset rollback page may be avoided, and the accuracy of the rollback operation may be increased.

Figure 6:
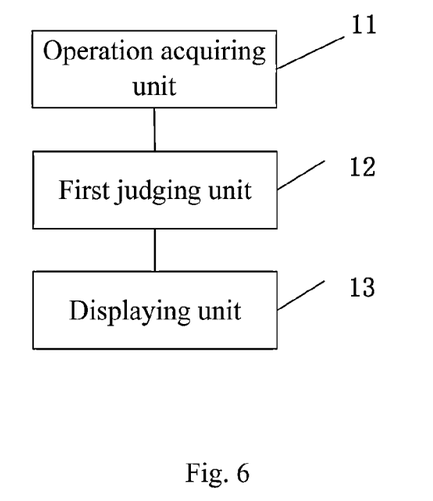
FIG. 6 is a diagram showing a device for controlling page rollback according to an exemplary embodiment.

FIG. 6 is a diagram showing an exemplary device for controlling page rollback consistent with embodiments of the disclosure. As shown in FIG. 6, the device includes an operation acquiring unit 11, a first judging unit 12, and a displaying unit 13.

The operation acquiring unit 11 is configured to acquire a rollback operation. In some embodiments, the operation acquiring unit 11 may include a trigger detecting unit, a time length recording unit, a time length judging unit, and a second determining unit.

The trigger detecting unit is configured to detect whether the preset rollback widget is triggered. The time length recording unit is configured to record a time length of triggering for the rollback widget when the preset rollback widget is triggered. The time length judging unit is configured to judge whether the time length exceeds a preset time length threshold. The second determining unit is configured to determine that the rollback operation is acquired when the time length exceeds the preset time length threshold.

The first judging unit 12 is configured to judge whether a preset rollback page corresponding to the rollback operation exists. In some embodiments, the first judging unit may include a seeking unit.

The seeking unit is configured to seek whether a link address of the preset rollback page exists, or seek whether a page content of the preset rollback page is stored.

The preset rollback page is preset as the last viewed page before the current page or a history page before the last viewed page before the current page.

The displaying unit 13 is configured to display the preset rollback page when the preset rollback page exists.

For example, in the scenario that a plurality of pages are used to display an article or a plurality of pictures of the same series, using the device for controlling page rollback consistent with embodiments of the disclosure, a preset rollback page may be set to be a page containing a headline of the article or of the series of pictures. Thus, when a rollback operation entered by a user is acquired, the rollback page containing the headline can be opened directly. Such an operation is convenient, and avoids clicking the "back to the last page" widget multiple times to return to a previous history page.

Figure 7:
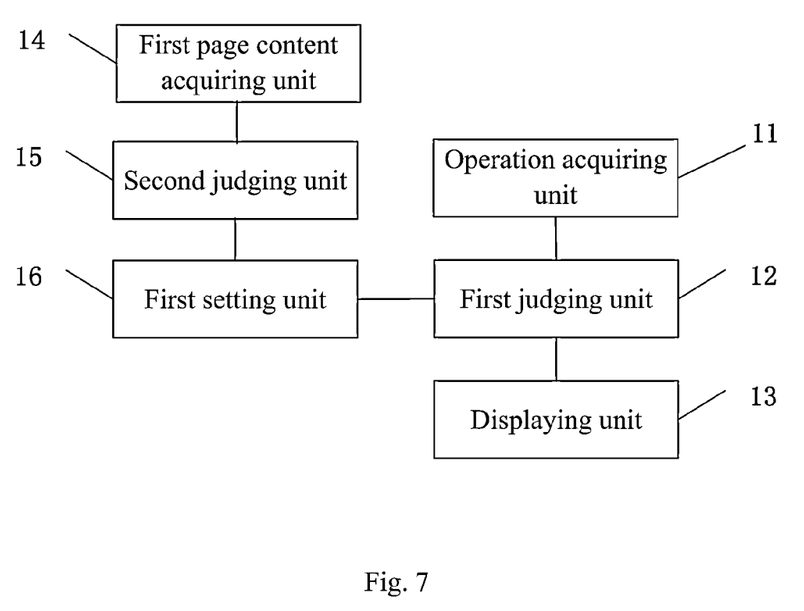
FIG. 7 is a diagram showing a device for controlling page rollback according to an exemplary embodiment.

FIG. 7 is a diagram showing an exemplary device for controlling page rollback consistent with embodiments of the disclosure. As shown in FIG. 7, the device includes the operation acquiring unit 11, the first judging unit 12, the displaying unit 13, a first page content acquiring unit 14, a second judging unit 15, and a first setting unit 16.

The first page content acquiring unit 14 is configured to acquire a page content of a current page and a page content of a last viewed page before the current page.

The second judging unit 15 is configured to judge whether a structural similarity between the page content of the current page and the page content of the last viewed page before the current page exceeds a first preset similarity threshold.

The first setting unit 16 is configured to set the last viewed page before the current page as the preset rollback page when the structural similarity between the page content of the current page and the page content of the last viewed page before the current page does not exceed the first preset similarity threshold, and to keep the preset rollback page unchanged when the structural similarity between the page content of the current page and the page content of the last viewed page before the current page exceeds the first preset similarity threshold.

In the embodiments described above, only when the structural similarity between the page content of the current web page and the page content of the last viewed page before the current page does not exceed the preset threshold, that is, the two page contents do not belong to the pages of the same headline, there is a need to further determine whether the last viewed page before the current web page is to be set as the preset rollback page. On the other hand, when the structural similarity between the page content of the current web page and the page content of the last viewed page before the current page exceeds the preset threshold, the previous preset rollback page is kept unchanged.

According to the above-described device, when the web pages corresponding to different headlines are browsed, the preset rollback page may be updated in time, such that the user may rollback to a certain preset rollback page when browsing any of the web pages. In addition, when the user browses a plurality of pages corresponding to the same headline, it is also able to assure that the preset rollback page is kept unchanged.

Figure 8:
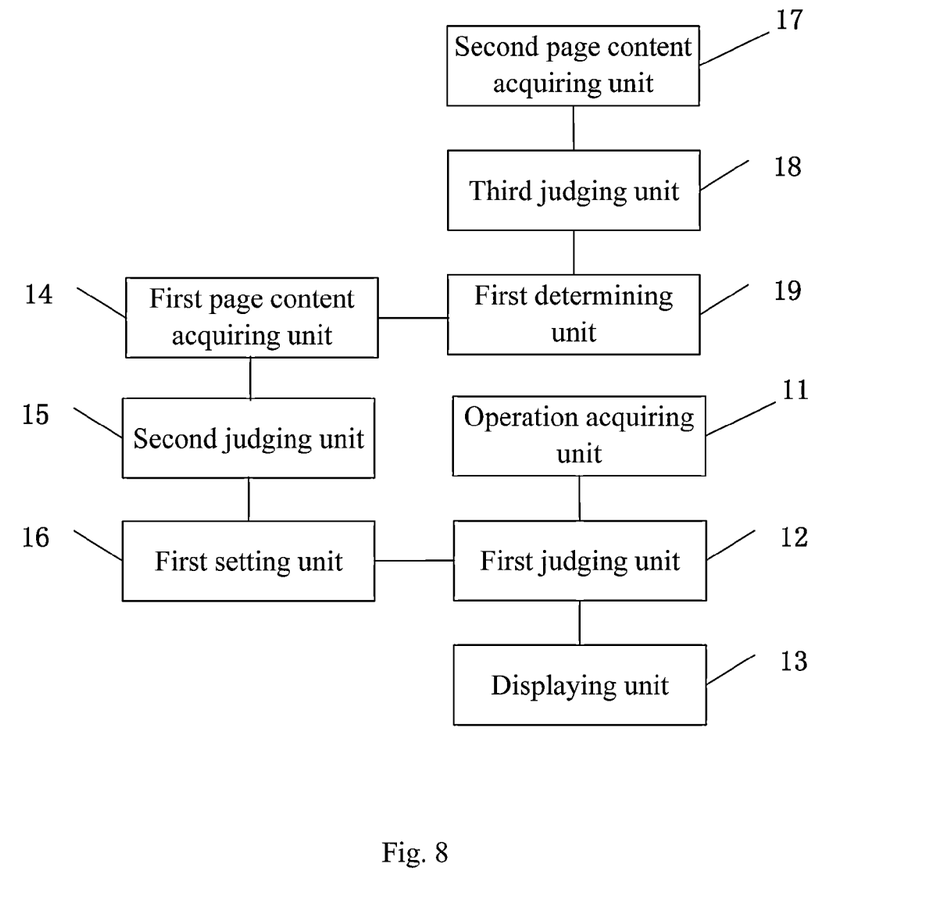
FIG. 8 is a diagram showing a device for controlling page rollback according to an exemplary embodiment.

FIG. 8 is a diagram showing an exemplary device for controlling page rollback consistent with embodiments of the disclosure. As shown in FIG. 8, the device includes the operation acquiring unit 11, the first judging unit 12, the displaying unit 13, the first page content acquiring unit 14, the second judging unit 15, the first setting unit 16, a second page content acquiring unit 17, a third judging unit 18, and a first determining unit 19.

The second page content acquiring unit 17 is configured to acquire a page content of a page to be jumped to corresponding to a preset hyperlink on the current page and a page content of the current page.

In some embodiments, the second page content acquiring unit 17 may include a hyperlink acquiring unit, a hyperlink judging unit, and a page content acquiring sub-unit.

The hyperlink acquiring unit is configured to acquire all the hyperlinks on the current page. The hyperlink judging unit is configured to judge whether a preset hyperlink exists among all the hyperlinks on the current page. Feature characters for identifying the preset hyperlink may include next page, next article, next chapter, next, →, or ↓. The page content acquiring sub-unit is configured to acquire the page content of the page to be jumped to corresponding to the preset hyperlink when the preset hyperlink exists among all the hyperlinks on the current page.

The third judging unit 18 is configured to judge whether a structural similarity between the page content of the page to be jumped and the page content of the current page exceeds a second preset similarity threshold.

The first determining unit 19 is configured to determine the current page as one of a plurality of pages that correspond to a same headline, when the structural similarity between the page content of the page to be jumped to and the page content of the current page exceeds the second preset similarity threshold.

In addition, the first page content acquiring unit 14 is further configured to acquire a page content of the current page and a page content of the last viewed page before the current page when the current page is one of the plurality of pages that correspond to the same headline.

According to the embodiments described above, by dually judging the structural similarity between the page content of the page to be jumped to and the page content of the current page, and the structural similarity between the page content of the current page and the page content of the last viewed page before the current page, the update of the preset rollback page may be performed more accurately. Therefore, rollback operation failure caused by an incorrect update of the preset rollback page may be avoided, and the accuracy of the rollback operation may be increased.

In some embodiments, the device for controlling page rollback may further include a parsing unit and a comparing unit. The parsing unit is configured to parse DOM tree structures of document object models of the page contents of the current page and the last viewed page before the current page. The comparing unit is configured to determine a structural similarity between the page contents of the two pages by comparing the DOM tree structures of the page contents thereof.

The comparing unit may be connected with the second judging unit 15 or the third judging unit 18, such that the second judging unit 15 or the third judging unit 18 may perform judging processes by using the structure similarity acquired by the comparing unit.

Figure 9:
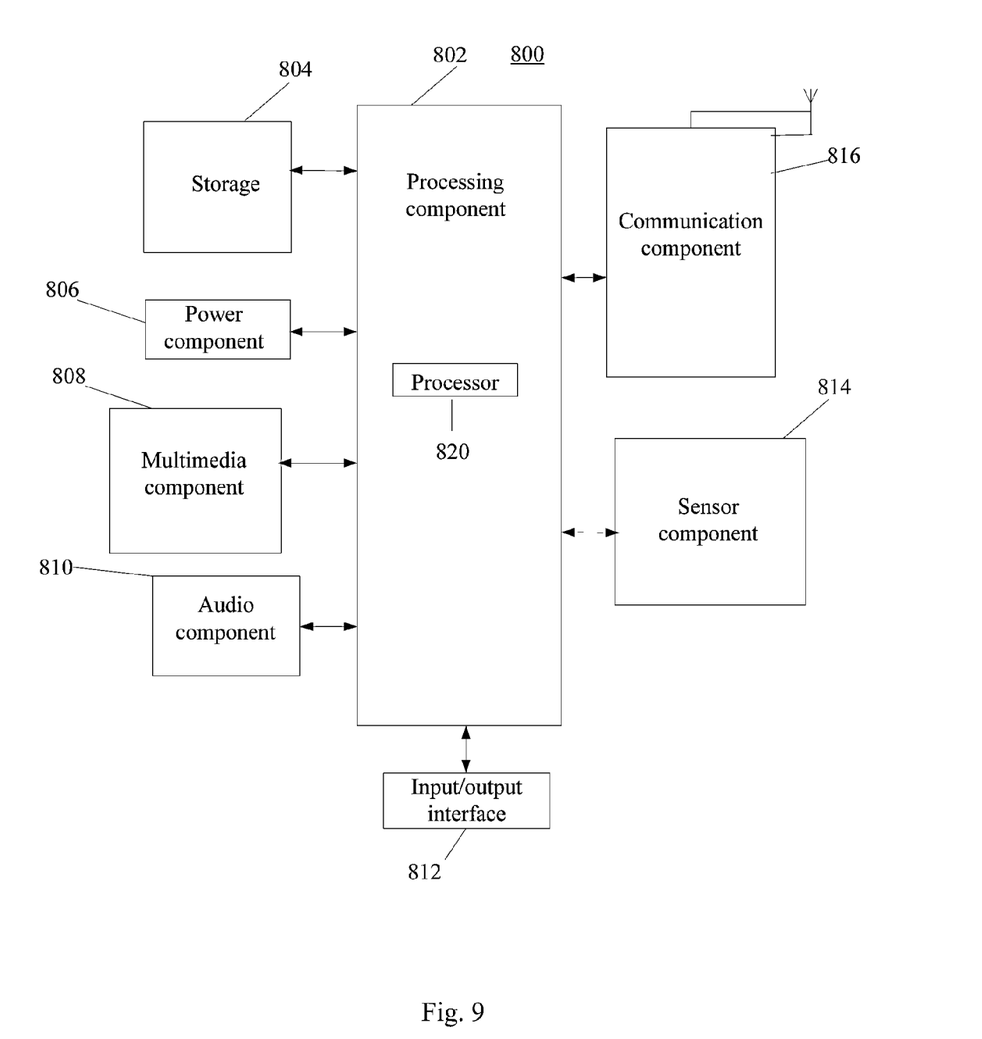
FIG. 9 is an illustrative structural block diagram showing a terminal for controlling page rollback according to an exemplary embodiment.

FIG. 9 is an illustrative structural block diagram showing an exemplary terminal 800 for controlling page rollback consistent with embodiments of the disclosure. The terminal 800 may be, for example, a mobile phone, a computer, a digital broadcast terminal, a message transceiver device, a gaming console, a tablet, a medical device, exercise equipment, a personal digital assistant, and the like.

Referring to FIG. 9, the terminal 800 includes a processing component 802, a storage 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations and recording operations. The processing component 802 includes one or more processors 820 to execute instructions to perform all or part of the methods consistent with embodiments of the disclosure. Moreover, the processing component 802 may include one or more modules which facilitate the interaction between the processing component 802 and other components. For instance, the processing component 802 may include a multimedia module to facilitate the interaction between the multimedia component 808 and the processing component 802.

The storage 804 is configured to store various types of data to support the operation of the terminal 800. Examples of such data include instructions for any applications or methods operated on the terminal 800, contact data, phonebook data, messages, pictures, video, etc. The storage 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power for the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive external multimedia data while the terminal 800 is in an operation mode such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal 800 is in an operation mode such as a call mode, a recording mode, and a voice recognition mode. The received audio signal may be further stored in the storage 804 or transmitted via the communication component 816. In some embodiments, the audio component 810 further includes a speaker to output audio signals.

The I/O interface 812 provides an interface between the processing component 802 and peripheral interface modules such as a keyboard, a click wheel, buttons, and the like. The buttons may include, but are not limited to a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components (e.g., the display and the keypad of the terminal 800), a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 may access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there also provides a non-transitory computer-readable storage medium storing instructions that, when executed by a processor of a mobile terminal, cause the mobile terminal to perform a method for controlling page rollback, such as the storage 804 including instructions, which is executable by the processor 820 in the terminal 800 for performing the above-described methods. For example, the non-transitory computer-readable storage medium may be a ROM, a RAM, a CD-ROM, a magnetic tape, a floppy disc, an optical data storage device, and the like.

Those skilled in the art will recognize that part or all of the methods described above may be implemented with hardware, or programs instructing the related hardware. The programs may be stored in a computer readable storage medium. The storage medium described above may be a read-only memory, a magnetic disc, an optical disc or the like.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling page rollback, comprising:
   acquiring a first page content of a current page and a second page content of a last viewed page before the current page;
   judging whether a structural similarity between the first page content and the second page content exceeds a similarity threshold;
   if the structural similarity exceeds the similarity threshold, keeping a preset rollback page unchanged, the preset rollback page being one of a null page or a previously viewed page viewed before the last viewed page;
   if the structural similarity does not exceed the similarity threshold, updating the preset rollback page to be the last viewed page before the current page;
   acquiring a rollback operation;
   judging whether a preset rollback page corresponding to the rollback operation exists; and
   displaying the preset rollback page if the preset rollback page exists.

2. The method according to claim 1, further comprising:
   parsing a first document object model (DOM) tree structure of the first page content and a second DOM tree structure of the second page content; and
   determining the structural similarity by comparing the first and second DOM tree structures.

3. The method according to claim 1, wherein the structural similarity is a second structural similarity, and the similarity threshold is a second similarity threshold, the method further comprising:
   acquiring a third page content of a page to be jumped to, the page to be jumped to corresponding to a preset hyperlink on the current page;
   judging whether a first structural similarity between the first page content and the third page content exceeds a first similarity threshold; and
   if the first structural similarity exceeds the first similarity threshold, performing:
      acquiring the first page content of the current page and the second page content of the last viewed page before the current page;
      judging whether the second structural similarity between the first page content and the second page content exceeds the second similarity threshold;
      if the second structural similarity exceeds the second similarity threshold, keeping of the preset rollback page unchanged; and
      if the second structural similarity does not exceed the second similarity threshold, updating the preset rollback page to be the last viewed page before the current page.

4. The method according to claim 3, wherein acquiring the third page content includes:
   acquiring hyperlinks on the current page;
   judging whether the preset hyperlink exists among the hyperlinks by determining whether one of the hyperlinks is associated with at least one of next page, next article, next chapter, next, →, or ↓; and
   if the preset hyperlink exists among the hyperlinks on the current page, acquiring the third page content of the page to be jumped to that corresponds to the preset hyperlink.

5. The method according to claim 1, wherein acquiring the rollback operation includes:
   detecting whether a preset rollback widget is triggered;
   when the preset rollback widget is triggered, recording a time length of triggering for the rollback widget;
   judging whether the time length exceeds a preset time length threshold; and
   if the time length exceeds the preset time length threshold, determining that the rollback operation is acquired.

6. The method according to claim 1, wherein judging whether the preset rollback page corresponding to the rollback operation exists includes:
   seeking whether a link address of the preset rollback page exists; or
   seeking whether a page content of the preset rollback page is stored.

7. A device for controlling page rollback, comprising:
   a processor; and
   a non-transitory computer-readable storage medium storing a computer program that, when executed by the processor, causes the processor to:
      acquire a first page content of a current page and a second page content of a last viewed page before the current page;
      judge whether a structural similarity between the first page content and the second page content exceeds a similarity threshold;
      if the structural similarity exceeds the similarity threshold, keep a preset rollback page unchanged, the preset rollback page being one of a null page or a previously viewed page viewed before the last viewed page;
      if the structural similarity does not exceed the similarity threshold, update the preset rollback page to be the last viewed page before the current page;
      acquire a rollback operation;
      judge whether a preset rollback page corresponding to the rollback operation exists; and
      display the preset rollback page if the preset rollback page exists.

8. The device according to claim 7, wherein the program further causes the processor to:
   parse a first document object model (DOM) tree structure of the first page content and a second DOM tree structure of the second page content; and
   determine the structural similarity by comparing the first and second DOM tree structures.

9. The device according to claim 7, wherein the structural similarity is a second structural similarity, and the similarity threshold is a second similarity threshold, and wherein the program further causes the processor to:
   acquire a third page content of a page to be jumped to, the page to be jumped to corresponding to a preset hyperlink on the current page;
   judge whether a first structural similarity between the first page content and the third page content exceeds a first similarity threshold; and
   if the first structural similarity exceeds the first similarity threshold:

acquire the first page content of the current page and the second page content of the last viewed page before the current page;

judge whether the second structural similarity between the first page content and the second page content exceeds the second similarity threshold;

if the second structural similarity exceeds the second similarity threshold, keep the preset rollback page unchanged; and if the second structural similarity does not exceed the second similarity threshold, update the preset rollback page to be the last viewed page before the current page.

10. The device according to claim 9, wherein the program causing the processor to acquire the third page content includes the program causing the processor to:

acquire hyperlinks on the current page;

judge whether a preset hyperlink exists among the hyperlinks by determining whether one of the hyperlinks is associated with at least one of next page, next article, the next chapter, next, →, or ↓; and acquire the third page content if the preset hyperlink exists among the hyperlinks on the current page.

11. The device according to claim 7, wherein the program causing the processor to acquire the rollback operation includes the program causing the processor to:

detect whether a preset rollback widget is triggered;

record a time length of triggering for the rollback widget when the preset rollback widget is triggered;

judge whether the time length exceeds a preset time length threshold; and determine that the rollback operation is acquired if the time length exceeds the preset time length threshold.

12. The device according to claim 7, wherein the program causing the processor to judge whether the preset rollback page corresponding to the rollback operation exists includes the program causing the processor to:

seek whether a link address of the preset rollback page exists; or seek whether a page content of the preset rollback page is stored.

13. A non-transitory computer-readable storage medium having stored therein instructions that, when executed by one or more processors of a terminal, cause the terminal to:

acquire a first page content of a current page and a second page content of a last viewed page before the current page;

judge whether a structural similarity between the first page content and the second page content exceeds a similarity threshold;

if the structural similarity exceeds the similarity threshold, keep a preset rollback page unchanged, the preset rollback page being one of a null page or a previously viewed page viewed before the last viewed page;

if the structural similarity does not exceed the similarity threshold, update the preset rollback page to be the last viewed page before the current page;

acquire a rollback operation;

judge whether a preset rollback page corresponding to the rollback operation exists; and display the preset rollback page if the preset rollback page exists.

* * * * *